United States Patent
Cakulev et al.

(10) Patent No.: US 11,805,400 B2
(45) Date of Patent: Oct. 31, 2023

(54) SYSTEMS AND METHODS FOR FACILITATING NETWORK FUNCTION DEVICE DISCOVERY

(71) Applicant: Verizon Patent and Licensing Inc., Basking Ridge, NJ (US)

(72) Inventors: Violeta Cakulev, Milburn, NJ (US); Sudhakar Reddy Patil, Flower Mound, TX (US); Hossein M. Ahmadi, Parsippany, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 17/247,404

(22) Filed: Dec. 10, 2020

(65) Prior Publication Data

US 2021/0099856 A1    Apr. 1, 2021

Related U.S. Application Data

(63) Continuation of application No. 16/540,438, filed on Aug. 14, 2019, now Pat. No. 10,887,751.

(51) Int. Cl.
*H04W 4/02* (2018.01)
*H04W 8/00* (2009.01)
*H04W 4/029* (2018.01)

(52) U.S. Cl.
CPC ........... *H04W 8/005* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 10,764,442 B1* | 9/2020 | Delaney | H04M 3/568 |
| 2010/0285827 A1* | 11/2010 | Kim | H04W 48/14 455/517 |
| 2012/0252354 A1 | 10/2012 | Itoh et al. | |
| 2017/0280376 A1 | 9/2017 | Nagahama et al. | |
| 2018/0084369 A1* | 3/2018 | Hou | H04W 4/40 |
| 2018/0227873 A1 | 8/2018 | Vrzic et al. | |
| 2020/0127916 A1* | 4/2020 | Krishan | H04L 47/125 |
| 2020/0154352 A1 | 5/2020 | Baek et al. | |
| 2020/0178139 A1 | 6/2020 | Shimojou et al. | |
| 2020/0257579 A1 | 8/2020 | Shekhar et al. | |
| 2020/0314672 A1* | 10/2020 | Farooq | H04L 43/0817 |
| 2021/0291982 A1* | 9/2021 | Tan | B64C 39/02 |
| 2021/0385286 A1* | 12/2021 | Wang | H04L 61/4511 |
| 2022/0022228 A1* | 1/2022 | Wang | H04W 76/14 |

\* cited by examiner

*Primary Examiner* — Dai Phuong

(57) ABSTRACT

A network repository function (NRF) device may receive first locality and priority information concerning a first network function device from the first network function device and may receive second locality and priority information concerning a second network function device from the second network function device. The NRF device may update a data structure based on the first locality and priority information and the second locality and priority information. The NRF device may receive a query concerning a locality from a third network function device and may search the data structure based on the query to identify network function device information associated with the locality. The NRF device may send the network function device information to the third network function device.

20 Claims, 9 Drawing Sheets

SYSTEMS AND METHODS FOR FACILITATING NETWORK FUNCTION DEVICE DISCOVERY

RELATED APPLICATION

This application is a continuation of U.S. patent application Ser. No. 16/540,438, entitled "SYSTEMS AND METHODS FOR FACILITATING NETWORK FUNCTION DEVICE DISCOVERY," filed Aug. 14, 2019, which is incorporated herein by reference.

BACKGROUND

A network repository function (NRF) device may support discovery of network function (NF) devices in a 5G wireless telecommunications system. The NRF device may maintain a profile of each available NF device, where each profile includes information such as an identifier of the NF device, a type of the NF device, a capacity of the NF device, and/or the like.

DETAILED DESCRIPTION OF PREFERRED EMBODIMENTS

Figure 1A:
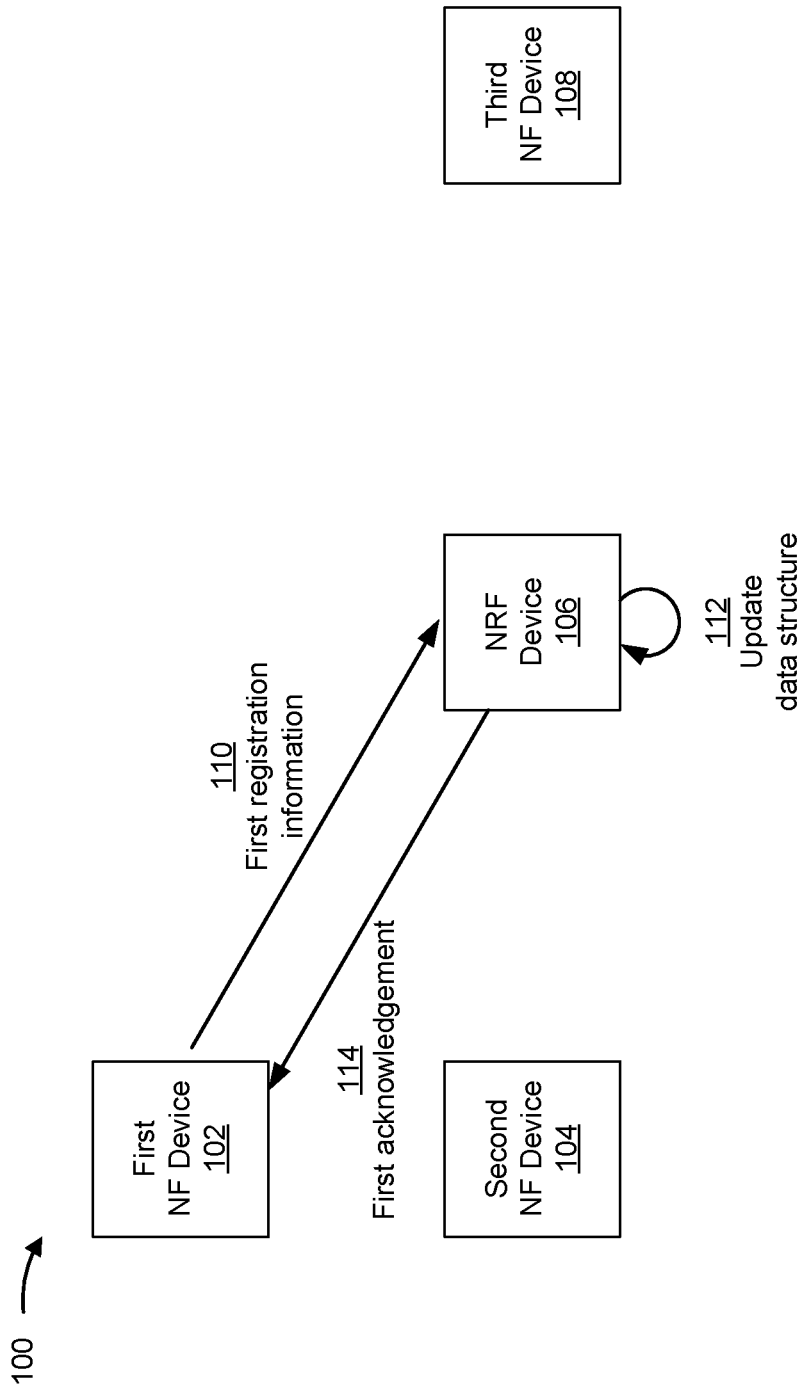
FIGS. 1A-1D are diagrams of one or more example implementations described herein.

The following detailed description of example implementations refers to the accompanying drawings. The same reference numbers in different drawings may identify the same or similar elements.

In some instances, a network repository function (NRF) device may maintain a profile of each available network function (NF) device in a 5G wireless telecommunications system. This allows NF devices of the 5G wireless telecommunications system to discover other NF devices of the 5G wireless telecommunications system. For example, an NF device may send a query to the NRF device regarding particular criteria and the NRF device may provide information concerning an NF device that satisfies the particular criteria. However, the NRF device can only maintain limited information about each NF device. Consequently, in many cases, the NRF device is not able to provide all the relevant information to a querying NF device. For example, in cases of geo-redundant wireless 5G deployments (e.g., where multiple NF devices of the same type service a locality (e.g., a geographic area)), the NRF device may be able to provide information on NF devices that service the locality, but not information on which NF device is a preferred NF device for the locality. This can lead to load balancing issues (e.g., querying NF devices attempting to communicate with the same overloaded NF device of the locality), latency issues (e.g., querying NF devices communicating with a distant NF device that services a locality instead of a closer NF device that is located within and services the locality, which may increase communication latency), and/or the like.

Some implementations described herein provide an NRF device that is capable of obtaining respective locality and priority information from one or more NF devices. In some implementations, the NRF device may update a data structure to indicate, for each NF device, one or more localities serviced by the NF device and a respective priority order value associated with the NF device for each locality of the one or more localities. In some implementations, the NRF device may receive a query concerning a locality from a querying NF device and the NRF device may search the data structure to identify NF device information associated with the locality. In some implementations, the NF device information may indicate, for the locality, one or more NF devices associated with the locality and a respective priority order value of each NF device, of the one or more NF devices, for the locality. In some implementations, the NRF device may send the NRF device information to the querying NF device, which may determine a priority order in which to communicate with the one or more NF devices based on the NF device information. In some implementations, the querying NF device may attempt to initiate a communication session with an NF device of the one or more NF devices based on the priority order.

In this way, the NRF device facilitates the querying NF device discovering and communicating with a preferred NF device of a locality. Moreover, the NRF device facilitates the querying NF device discovering and communicating with a backup preferred NF device of the locality when the preferred NF device is not available. This can increase a likelihood that the querying device communicates with an NF device that is intended to service the locality (as opposed to an NF device that can service the locality, but is intended to service a querying locality), which may mitigate load balancing issues (e.g., by ensuring that NF devices service localities that they are intended to service), latency issues (e.g., by ensuring that NF devices located within a locality service the locality, instead of distant NF devices outside the locality), and/or the like. Moreover, some implementations conserve resources (e.g., processing resources, memory resources, power resources, networking resources, and/or the like) of the querying device that would otherwise be used by the querying device to attempt to discover and communicate with a preferred NF device of a locality.

FIGS. 1A-1D are diagrams of one or more example implementations 100 described herein. Example implementation(s) may include one or more network function (NF) devices of a wireless telecommunications systems, such as a 5G wireless telecommunications system. For example, as shown in FIG. 1A, example implementation(s) 100 may include a first NF device 102, a second NF device 104, a network repository function (NRF) device 106, and a third NF device 108. The first NF device 102, the second NF device 104, and/or the third NF device 108 may each respectively connect to and communicate with the NRF device 106.

In some implementations, the first NF device 102 and the second NF device 104 may be the same type of NF device (e.g., the first NF device 102 and the second NF device 104 may each be a session management function (SMF) device, a policy control function (PCF) device, an application function (AF) device, and/or the like). Additionally, or alternatively, the first NF device 102 and the second NF may be different types of NF devices. In some implementations, when the third device needs to communicate with a particular type of NF device (e.g., the same type of NF device that includes the first NF device 102 and the second NF device 104), the third device may communicate with the NRF device 106 to determine the NF device with which the third device should communicate.

As shown in FIG. 1A and by reference number 110, the NRF device 106 may obtain first registration information from the first NF device 102. For example, the first NF device 102 may send the first registration information to the NRF device 106, and/or the NRF device 106 may request and receive the first registration information from the first NF device 102. The first registration information may include locality and priority information concerning the first NF device 102, as well as other information, such as information concerning services provided by the first NF device 102, information concerning a capacity of the first NF device 102, and/or the like. For example, the first registration information may identify a locality (e.g., a geographic area) associated with the first NF device 102 and/or a priority order value associated with the first NF device 102 for the locality (e.g., a value indicating a priority of the first NF device 102 for the locality as compared to other NF devices that are of the same type as the first NF device 102). For example, the first registration information may indicate that for locality A, the first NF device 102 has a priority order value of 1 (e.g., where a priority order value of 1 indicates a greater priority than any priority order value greater than 1, such as 2, 10, 100, and/or the like). In some implementations, the first registration information may identify one or more localities and/or one or more respective priority order values associated with the first NF device 102. For example, the first registration information may indicate that for locality A, the first NF device 102 has a priority order value of 1; for locality B, the first NF device 102 has a priority order value of 2 (e.g., where a priority order value of 2 indicates a lesser priority than a priority order value of 1, but a greater priority than any priority order value greater than 2); and/or the like.

As shown by reference number 112, the NRF device 106 may update a data structure associated with the NRF device 106 (e.g., a data structure that stores respective registration information associated with one or more NF devices). The NRF device 106 may update the data structure based on the first registration information. For example, the NRF device 106 may parse the first registration information to determine one or more localities and one or more respective priority order values associated with the first NF device 102, and update the data structure to indicate the one or more localities and the one or more respective priority order values for the first NF device 102. As shown by reference number 114, the NRF device 106 may send a first acknowledgement message to the first NF device 102. The first acknowledgement message may indicate that the NRF device 106 received the first registration information, updated the data structure based on the first registration information, and/or the like.

Figure 1B:
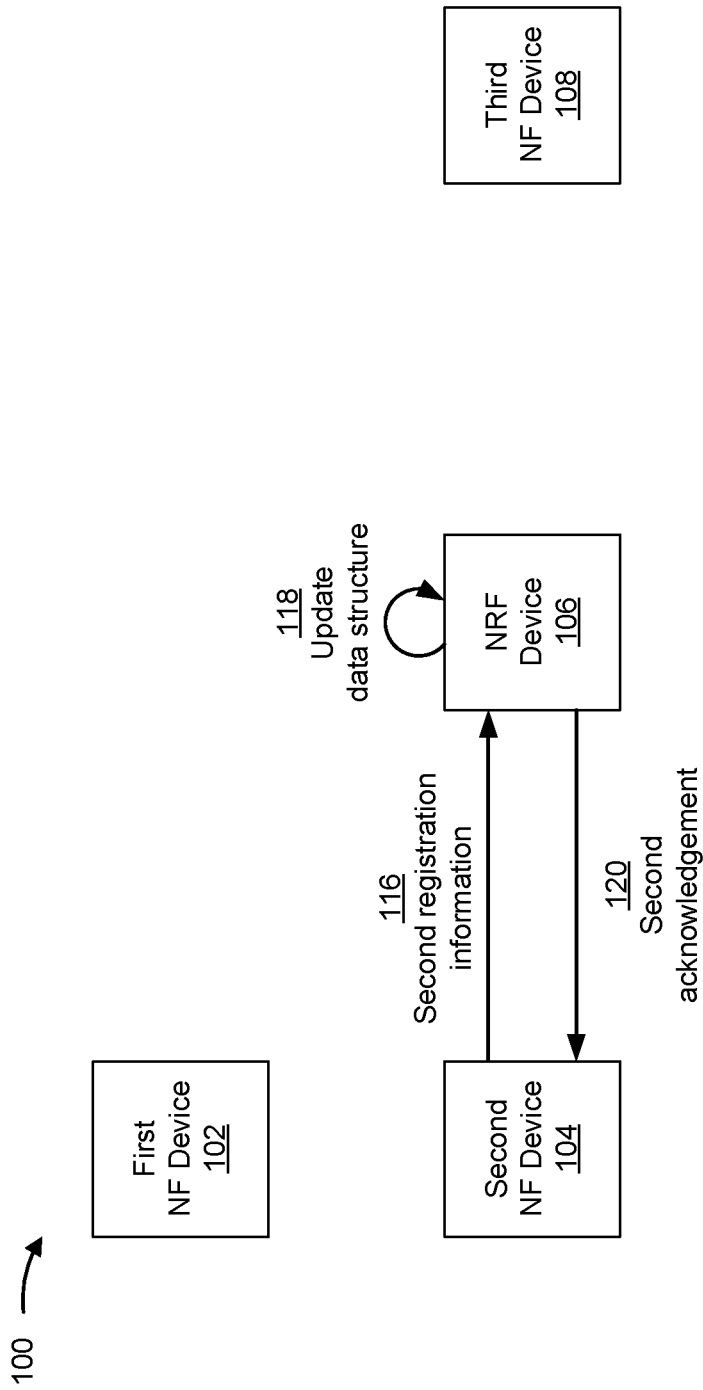

As shown in FIG. 1B and by reference number 116, the NRF device 106 may obtain second registration information from the second NF device 104 (e.g., in a similar manner as described herein in relation to FIG. 1A and reference number 110). For example, the second NF device 104 may send the second registration information to the NRF device 106 and/or the NRF device 106 may request and receive the second registration information from the second NF device 104. The second registration information may include locality and priority information concerning the second NF device 104. That is, the second registration information may identify one or more localities (e.g., one or more geographic areas) associated with the second NF device 104 and/or a respective priority order value associated with the second NF device 104 for each locality of the one or more localities (e.g., a respective value indicating a priority of the second NF device 104 for each locality as to other NF devices that are the same type as the second NF device 104). For example, the second registration information may indicate that for locality A, the second NF device 104 has a priority order value of 2; for locality B, the second NF device 104 has a priority order value of 1; and/or the like.

As shown by reference number 118, the NRF device 106 may update the data structure associated with the NRF device 106 (e.g., the data structure that stores respective registration information associated with one or more NF devices). The NRF device 106 may update the data structure based on the second registration information in a similar manner as described herein in relation to FIG. 1A and reference number 112. For example, the NRF device 106 may parse the second registration information to determine one or more localities and one or more respective priority order values associated with the second NF device 104, and update the data structure to indicate the one or more localities and the one or more respective priority order values for the second NF device 104. As shown by reference number 120, the NRF device 106 may send a second acknowledgement message to the second NF device 104. The second acknowledgement message may indicate that the NRF device 106 received the second registration information, updated the data structure based on the second registration information, and/or the like.

Figure 1C:
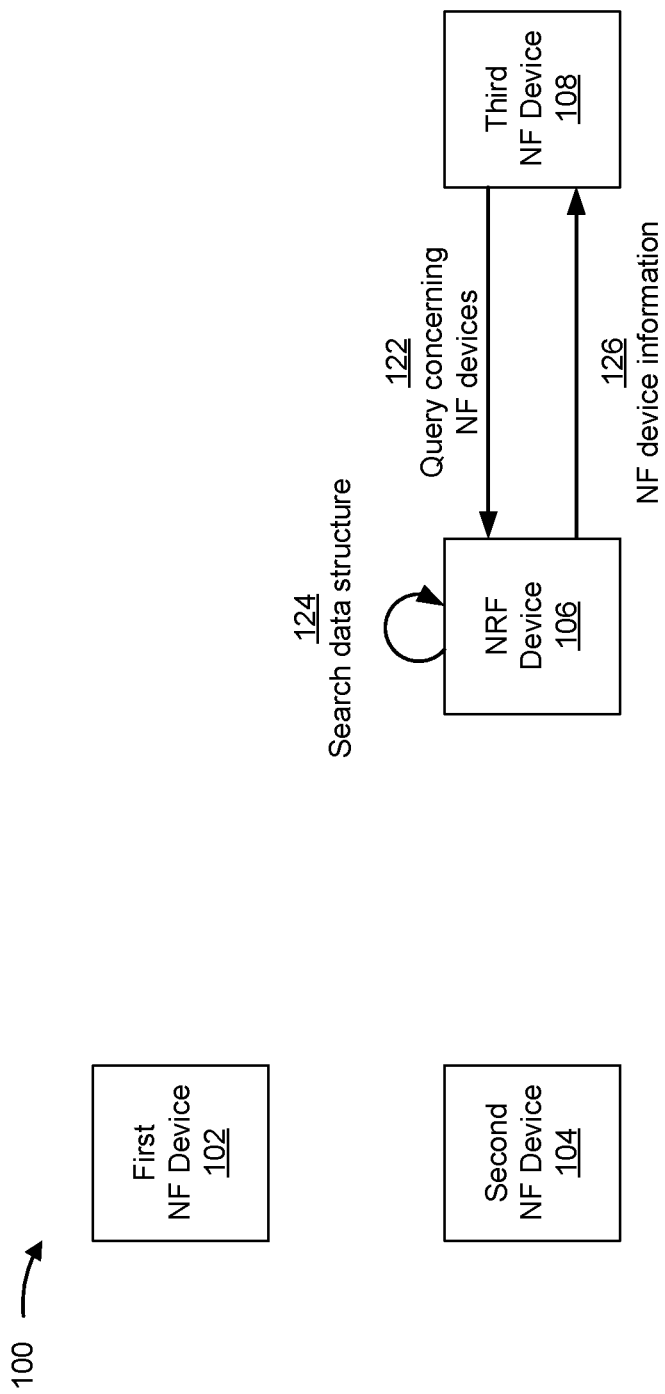

As shown in FIG. 1C and by reference number 122, the third NF device 108 may send a query to the NRF device 106. The query may concern NF devices registered with the NRF device 106 (e.g., NF devices that have sent registration information to the NRF device 106). For example, the query may indicate a locality (e.g., a locality associated with the third NF device 108, such as a preferred locality associated with the third NF device 108) and/or may request information identifying NF devices of a preferred type (e.g., the same type of NF device that includes the first NF device 102 and the second NF device 104) associated with the locality. As shown by reference number 124, the NRF device 106 may search the data structure (e.g., the data structure that stores respective registration information associated with one or more NF devices) based on the query. The NRF device 106 may parse the query to identify the locality and/or the preferred type of NF device, and may search the data structure to identify NF device information associated with the locality and/or the preferred type of NF device. The NF device information may indicate, for a locality, one or more NF devices (e.g., that have the same type as the preferred type of NF device) associated with the locality and a respective priority order value of each NF device, of the one or more NF devices, for the locality. For example, the NF device information may indicate a priority order value of the first NF device 102 for the locality and a priority order value of the second NF device 104 for the locality. Additionally, or alternatively, the NF device information may identify at least one NF device not associated with the locality (e.g., at least one default NF device that has the same type as the preferred type of NF device). As shown by reference number 126, the NRF device 106 may send the NF device information to the third NF device 108.

In an example, the third NF device 108 may send a query to the NRF indicating locality A, and the NRF device 106 may search the data structure for one or more NF devices associated with locality A. For each NF device associated with locality A, the NRF device 106 may determine a priority order value of the NF device for locality A (e.g., the first NF device 102 may have a priority order value of 1 for locality A, the second NF device 104 may have a priority order value of 2 for locality A, and/or the like). In this way, the NRF device 106 may identify NF device information that indicates the locality, one or more NF devices associated with locality A, and a respective priority order value of each NF device for the locality. The NRF device 106 may then send the NF device information to the third NF device 108.

Additionally, or alternatively, instead of sending a query to the NRF device 106, the third NF device 108 may send a subscription request concerning the locality to the NRF device 106. The subscription request may indicate a locality (e.g., a locality associated with the third NF device 108) and/or may request information identifying NF devices of a preferred type (e.g., the same type of NF device that includes the first NF device 102 and the second NF device 104) associated with the locality. Accordingly, the NRF device 106, based on the subscription request, may send the NF device information to the third NF whenever information concerning the locality is updated in the data structure (e.g., whenever an NF device sends new or updated registration information that concerns the locality to the NRF device 106). In this way, the third NF device 108 may automatically obtain updated NF device information concerning the locality.

Figure 1D:
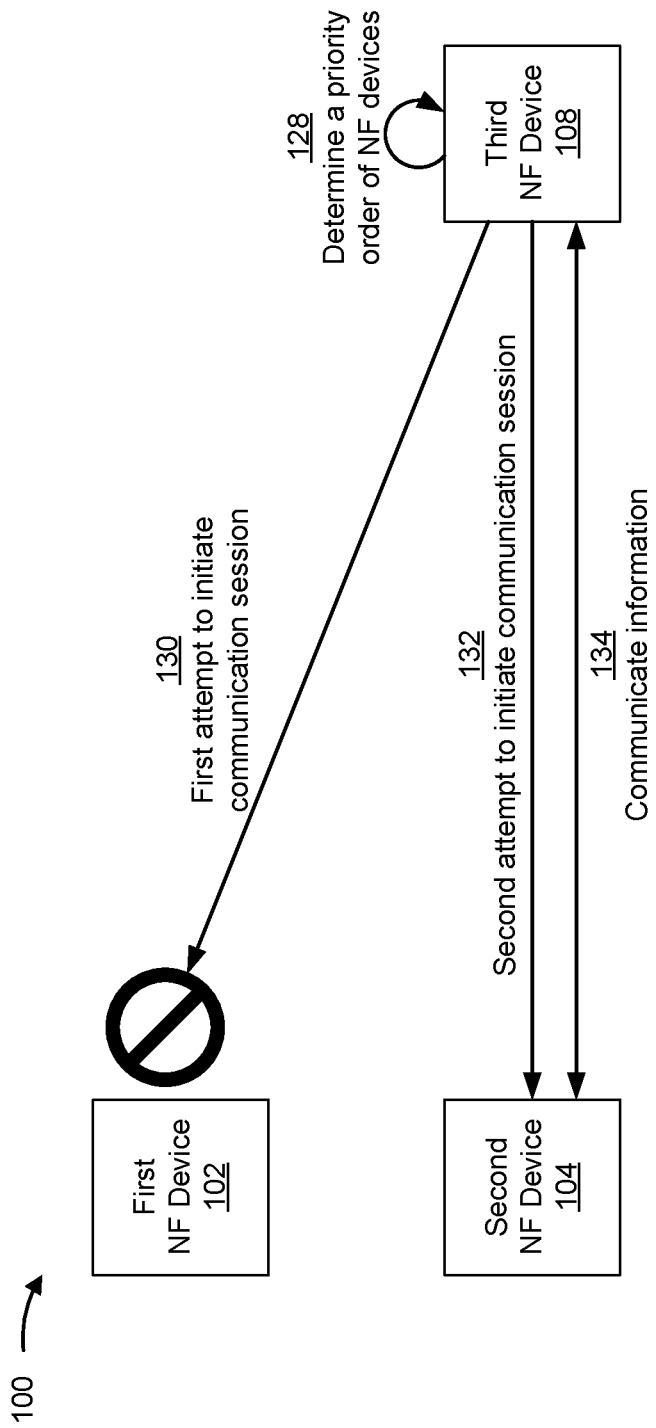

As shown in FIG. 1D and by reference number 128, the third NF device 108 may process the NF device information to determine a respective priority order value of the one or more NF devices associated with the locality. For example, the third NF device 108 may determine the priority order value of the first NF and/or the priority order value of the second NF device 104 based on the NF device information. In some implementations, the third NF device 108 may determine a priority order in which to attempt to initiate a communication session with the one or more NF devices based on the respective priority order values of the one or more NF devices. For example, the third NF device 108 may determine that the first NF device 102 has a greater priority than the second NF device 104 (e.g., based on the respective priority order values of the first and second NF devices) and may rank the first NF device 102 before the second NF device 104 in the priority order. In a specific example, where the first NF device 102 has a priority order value of 1 for a particular locality (e.g., locality A) and the second NF device 104 has a priority order value of 2 for the particular locality, the third NF device 108 may determine that the first NF device 102 has a greater priority than the second NF device 104 (e.g., because a priority order value of 1 has a greater priority than a priority order value of 2) and may rank the first NF device 102 before the second NF device 104 in the priority order.

As shown by reference number 130, the third device may attempt to initiate a communication session with the first NF device 102 (e.g., based on the first NF device 102 being ranked before the second NF device 104 in the priority order). In some implementations, based on the third NF device 108 attempting to initiate the communication session, a communication session may be established between the third NF device 108 and the first NF device 102, and the third NF device 108 and the first NF device 102 may communicate via the communication session. Additionally, or alternatively, when a communication session is not established between the third NF device 108 and the first NF device 102 (e.g., the first NF device 102 is down, the first NF device 102 is overloaded and cannot establish a new communication session with the third NF device 108, and/or the like), the third NF device 108 may determine that a communication session with the first NF device 102 cannot be established and may identify the next highest priority NF device in the priority order. In this example, the next highest priority NF device in the priority order is the second NF device 104 (since the first NF device 102 has a priority order value of 1 and the second NF device 104 has a priority order value of 2). Accordingly, as shown by reference number 132, the third device may determine that the second NF device 104 is the next highest priority NF device in the priority order, and may attempt to initiate a communication session with the second NF device 104. In some implementations, a communication session may be established between the third NF device 108 and the second NF device 104 based on the third NF device 108 attempting to initiate the communication session. As shown by reference number 134, after the communication session is established, the third NF device 108 and the second NF device 104 may communicate via the communication session.

In some implementations, a communication session is not established between the third NF device 108 and the second NF device 104. The third NF device 108 will then continuously determine the next highest priority NF device in the priority order and attempt to initiate a communication session with the next highest priority NF device in a similar manner as described herein until a communication session is established. In some implementations, when a communication session cannot be established between the third NF device 108 and any NF device in the priority order, the third NF device 108 may process the NF device information to identify at least one NF device not associated with the locality (e.g., at least one default NF device) and may attempt to initiate a communication session with the at least one NF device not associated with the locality. In some implementations, a communication session may be established between the third NF device 108 and the at least one NF device not associated with the locality based on the third NF attempting to initiate the communication session. After the communication session is established, the third NF device 108 and the at least one NF device not associated with the locality may communicate via the communication session.

As indicated above, FIGS. 1A-1D are provided merely as examples. Other examples may differ from what is described with regard to FIGS. 1A-1D. Further, the number and arrangement of devices and networks shown in FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
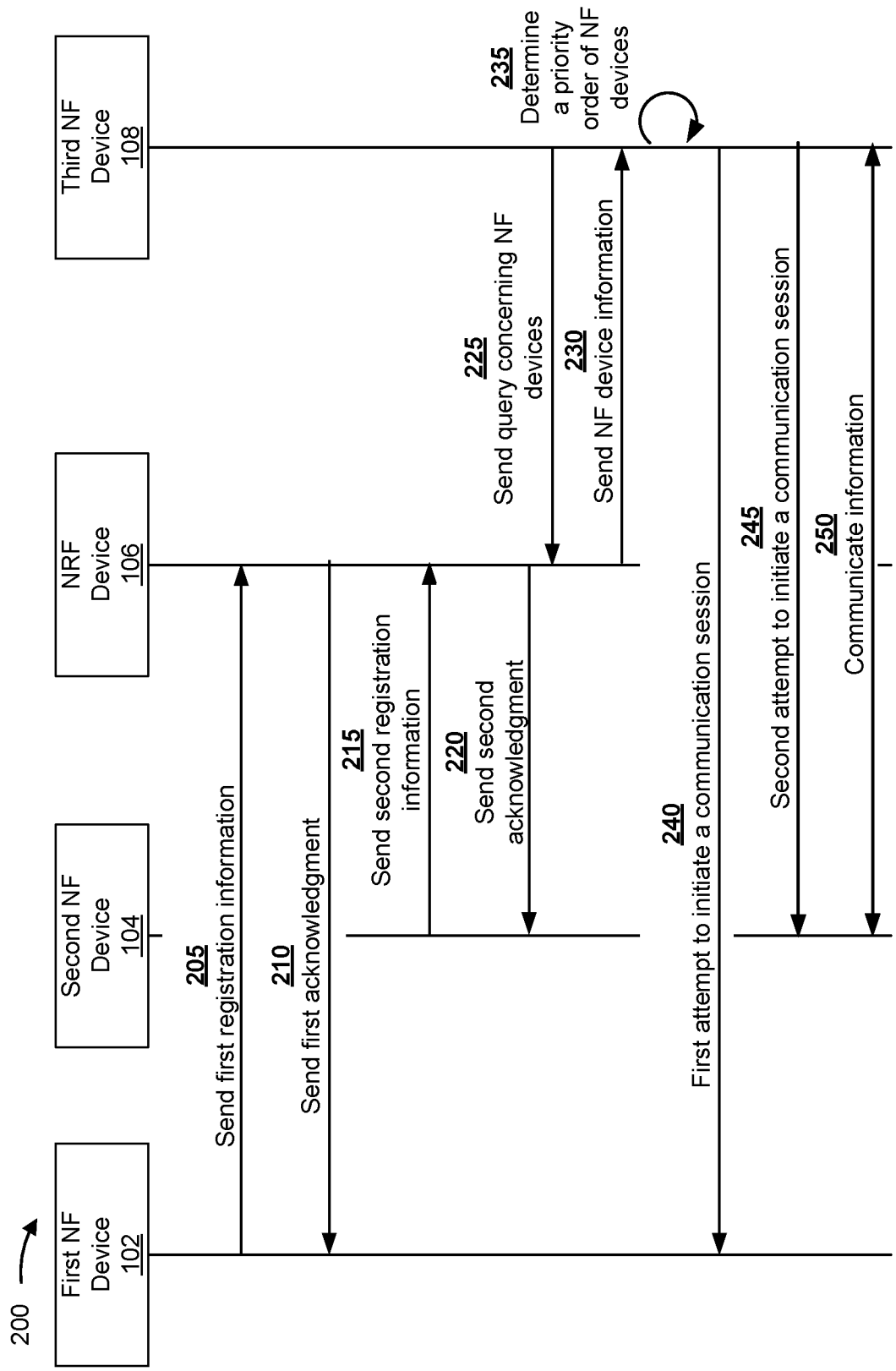
FIG. 2 is a diagram of an example call flow of example operations capable of being performed by one or more devices of FIGS. 1A-1D.

FIG. 2 is a diagram of an example call flow 200 of example operations capable of being performed by one or more devices of FIGS. 1A-1D. As shown in FIG. 2 and by reference number 205, a first NF device 102 may send first registration information to an NRF device 106 in a similar manner as described herein in relation to FIG. 1A and reference number 110. As shown by reference number 210, the NRF device 106 may send a first acknowledgement message to the first NF device 102 in a similar manner as described herein in relation to FIG. 1A and reference number 114. As shown by reference number 215, a second NF device 104 may send second registration information to the NRF device 106 in a similar manner as described herein in relation to FIG. 1B and reference number 116. As shown by reference number 220, the NRF device 106 may send a second acknowledgement message to the second NF device 104 in a similar manner as described herein in relation to FIG. 1B and reference number 120.

Further, as shown by reference number 225, a third NF device 108 may send a query concerning NF devices to the NRF device 106 in a similar manner as described herein in relation to FIG. 1C and reference number 122. As shown by reference number 230, the NRF may send NF device information to the third NF device 108 in a similar manner as described herein in relation to FIG. 1C and reference number 126. As shown by reference number 235, the third NF device 108 may determine a priority order of NF devices based on the NF device information in a similar manner as described herein in relation to FIG. 1D and reference number 128. As shown by reference number 240, the third NF device 108 may attempt to initiate a communication session with the first NF device 102 in a similar manner as described herein in relation to FIG. 1D and reference number 130. The third NF device 108 may determine that a communication session with the first NF device 102 cannot be established and, as shown by reference number 245, may attempt to initiate a communication session with the second NF device 104 in a similar manner as described herein in relation to FIG. 1D and reference number 132. As shown by reference number 250, after the communication session is established, the third NF device 108 and the second NF device 104 may communicate via the communication session in a similar manner as described herein in relation to FIG. 1D and reference number 134.

As indicated above, FIG. 2 is provided merely as an example. Other examples can differ from what is described with regard to FIG. 2.

Figure 3:
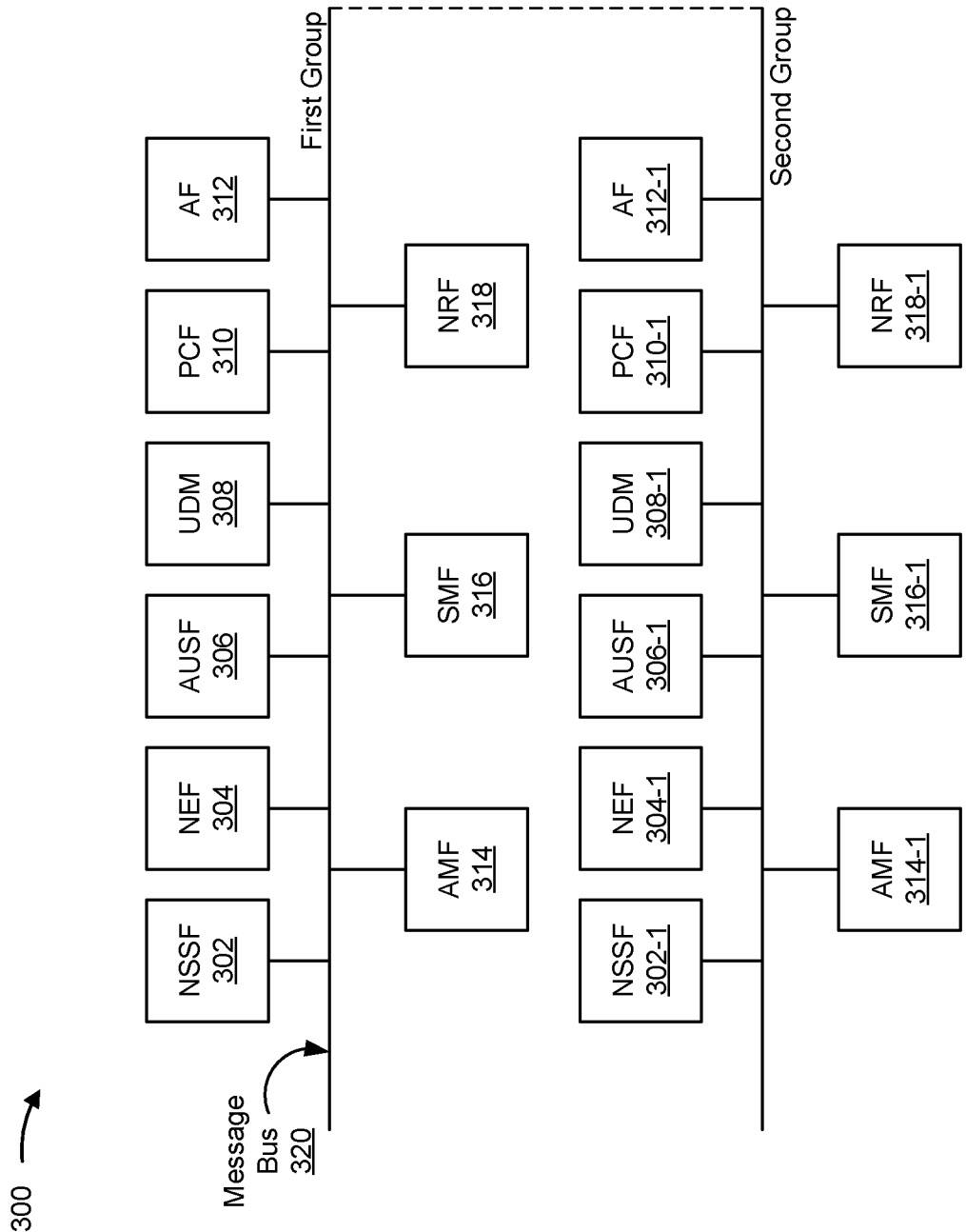
FIG. 3 is a diagram of an example environment in which systems and/or methods described herein may be implemented.

FIG. 3 is a diagram of an example environment 300 in which systems and/or methods described herein may be implemented. For example, FIG. 3 may show an example architecture of a 5G NG core network included in a 5G wireless telecommunications system. As shown in FIG. 3, network function (NF) devices of a first group may include, for example, a network slice selection function (NSSF) device 302, a network exposure function (NEF) device 304, an authentication server function (AUSF) device 306, unified data management (UDM) device 308, a policy control function (PCF) device 310, an application function (AF) device 312, an access and mobility management function (AMF) device 314, a session management function (SMF) device 316, and/or a network repository function (NRF) device 318. NF devices of a second group may include, for example, NF devices of the same type as the NF devices of the first group, such as an NSSF device 302-1, an NEF device 304-1, an AUSF device 306-1, a UDM device 308-1, a PCF device 310-1, an AF device 312-1, an AMF device 314-1, an SMF device 316-1, and/or an NRF device 318-1. The NF devices of the first group and the second group may be communicatively connected via message bus 320. The NF devices of the first group and the second group may each be associated with one or more localities. NF devices of the same type (e.g., PCF device 310 and PCF device 310-1, SMF device 316, SMF device 316-1, and/or the like) may each have a respective priority order value (as described herein) for a locality. First NF device 102 may correspond to an NF device of the first group and second NF device 104 may correspond to an NF device of the second group of the same NF device type (e.g., first NF device 102 may correspond to NEF device 304 and second NF device 104 may correspond to NEF device 304-1). Third NF device 108 may correspond to any NF device of the first group and the second group.

Each of the NF devices shown in FIG. 3 is implemented on one or more devices associated with a wireless telecommunications system. In some implementations, one or more of the NF devices may be implemented on physical devices, such as an access point, a base station, a gateway, and/or the like. In some implementations, one or more of the NF devices may be implemented on a computing device of a cloud computing environment.

NSSF device 302 and NSSF device 302-1 are each a hardware-based device that may select network slice instances for user equipment (UE). By providing network slicing, NSSF device 302 and NSSF device 302-1 allow an operator to deploy multiple substantially independent end-to-end networks potentially with the same infrastructure. In some implementations, each slice may be customized for different services. NEF device 304 and NEF device 304-1 are each a hardware-based device that may support the exposure of capabilities and/or events in the wireless telecommunications system to help other entities in the wireless telecommunications system discover network services.

AUSF device 306 and AUSF device 306-2 are each a hardware-based device that may act as an authentication server and support the process of authenticating UEs in the wireless telecommunications system. UDM device 308 and UDM device 308-1 are each a hardware-based device that may store subscriber data and profiles in the wireless telecommunications system. PCF device 310 and PCF device 310-1 are each a hardware-based device that may provide a policy framework that incorporates network slicing, roaming, packet processing, mobility management, and/or the like.

AF device 312 and AF device 312-1 are each a hardware-based device that may support application influence on traffic routing, access to a NEF device (e.g., NEF device 304, NEF device 304-1, and/or the like), policy control, and/or the like. AMF device 314 and AMF device 314-1 are each a hardware-based device that may act as a termination point for Non Access Stratum (NAS) signaling, mobility management, and/or the like. SMF device 316 and SMF device 316-1 are each a hardware-based device that may support the establishment, modification, and release of communications sessions in the wireless telecommunications system.

NRF device 318 and NRF device 318-1 are each a hardware-based device that may provide a discovery function for other NF devices. An NF device (e.g., of FIG. 3) may send registration information to NRF device 318 and/or NRF device 318-1. NRF device 318 and/or NRF device 318-1 may each update a respective data structure based on the registration information (e.g., maintain a profile concerning the NF device). The registration information may include locality and priority information concerning the NF device, and NRF device 318 and/or NRF device 318-1 may each update the respective data structure to indicate the locality and priority information for the NF device. NRF device 318 and/or NRF device 318-1 may each receive a query concerning a locality from a different NF device (e.g., any other NF device of FIG. 3) and may send NF device information (e.g., information concerning one or more NF devices associated with the locality and a respective priority order of the one or more NF devices for the locality) to the different NF device.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
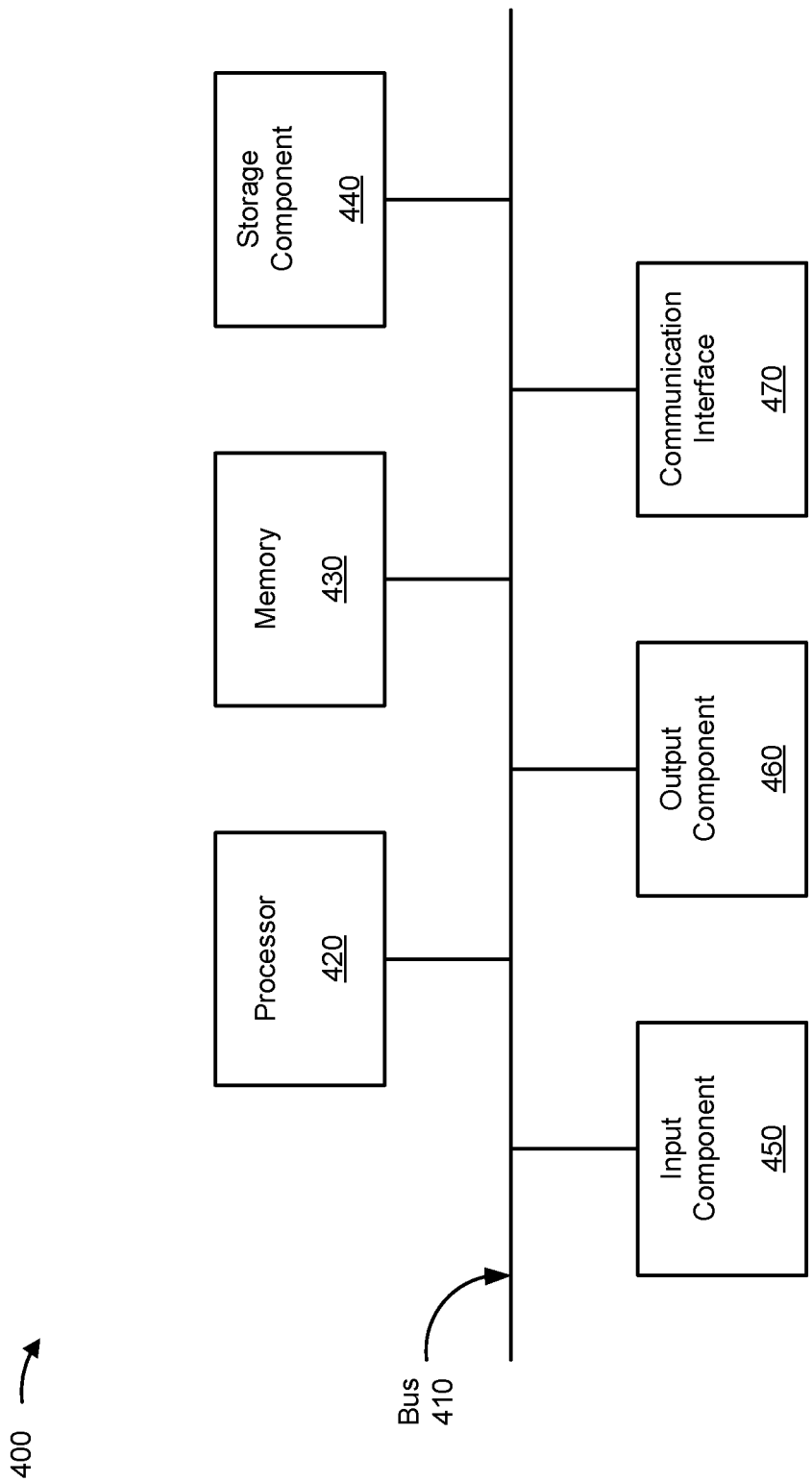
FIG. 4 is a diagram of example components of one or more devices of FIG. 2.

FIG. 4 is a diagram of example components of a device 400. Device 400 may correspond to first NF device 102, second NF device 104, NRF device 106, third NF device 108, NSSF device 302, NEF device 304, AUSF device 306, UDM device 308, PCF device 310, AF device 312, AMF device 314, SMF device 316, NRF device 318, NSSF device 302-1, NEF device 304-1, AUSF device 306-1, UDM device 308-1, PCF device 310-1, AF device 312-1, AMF device 314-1, SMF device 316-1, and/or NRF device 318-1. In some implementations first NF device 102, second NF device 104, NRF device 106, third NF device 108, NSSF device 302, NEF device 304, AUSF device 306, UDM device 308, PCF device 310, AF device 312, AMF device 314, SMF device 316, NRF device 318, NSSF device 302-1, NEF device 304-1, AUSF device 306-1, UDM device 308-1, PCF device 310-1, AF device 312-1, AMF device 314-1, SMF device 316-1, and/or NRF device 318-1 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
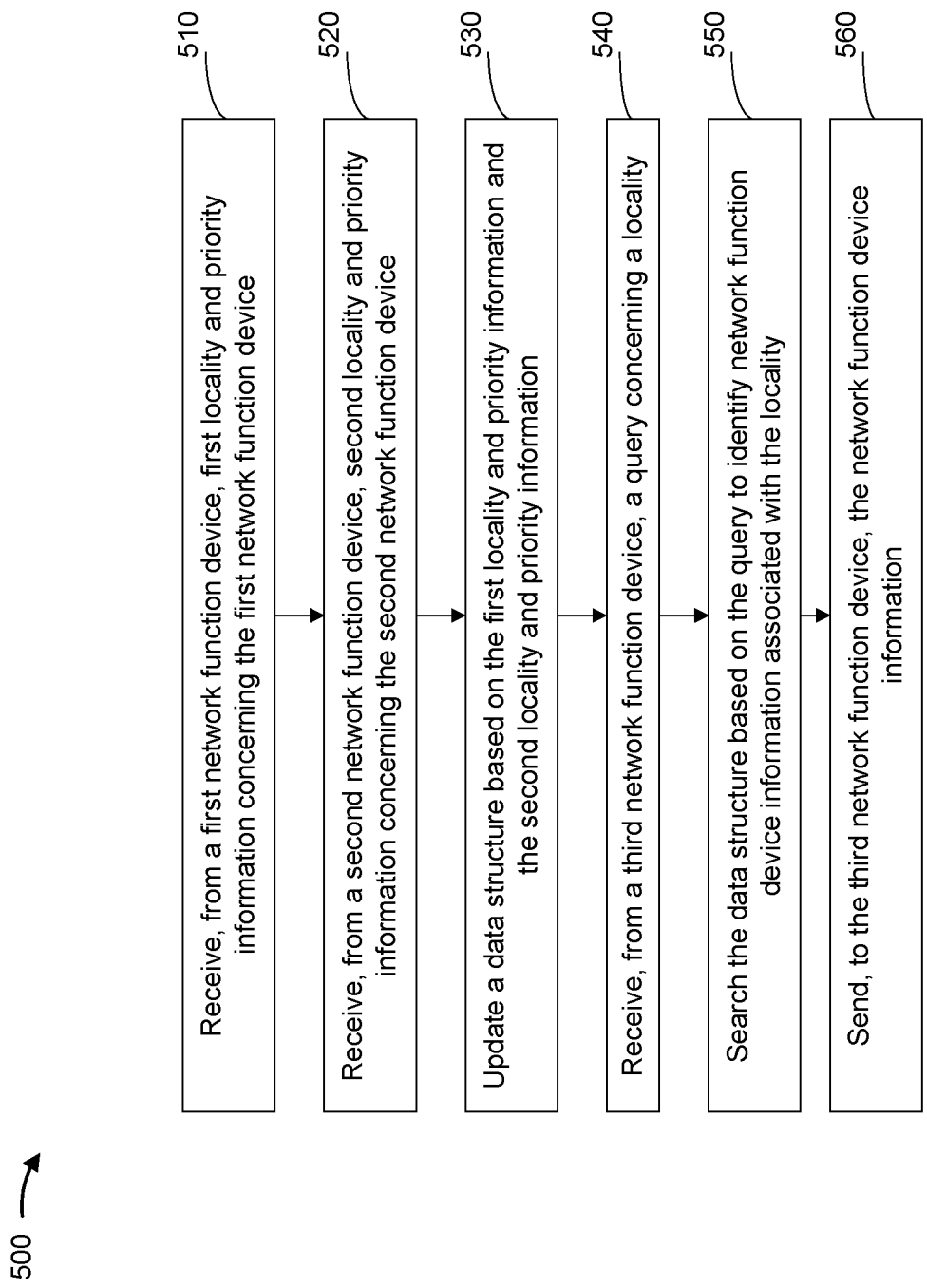
FIGS. 5-6 are flowcharts of example processes for facilitating network function device discovery.

FIG. 5 is a flow chart of an example process 500 for facilitating network function device discovery. In some implementations, one or more process blocks of FIG. 5 may be performed by a network repository function (NRF) device (e.g., NRF device 106, NRF device 318, NRF device 318-1, and/or the like). In some implementations, one or more process blocks of FIG. 5 may be performed by another device or a group of devices separate from or including the NRF device, such as a different network function (NF) device (e.g., first NF device 102, second NF device 104, third NF device 108, NSSF device 302, NEF device 304, AUSF device 306, UDM device 308, PCF device 310, AF device 312, AMF device 314, SMF device 316, NRF device 318, NSSF device 302-1, NEF device 304-1, AUSF device 306-1, UDM device 308-1, PCF device 310-1, AF device 312-1, AMF device 314-1, SMF device 316-1, NRF device 318-1, and/or the like).

As shown in FIG. 5, process 500 may include receiving, from a first network function device, first locality and priority information concerning the first network function device (block 510). For example, the NRF device (e.g., using processor 420, memory 430, storage component 440, input component 450, output component 460, communication interface 470, and/or the like) may receive, from a first network function device, first locality and priority information concerning the first network function device, as described above. The first locality and priority information may include an indication of at least one locality and a respective priority order value associated with the first network function device.

As further shown in FIG. 5, process 500 may include receiving, from a second network function device, second locality and priority information concerning the second network function device (block 520). For example, the NRF device (e.g., using processor 420, memory 430, storage component 440, input component 450, output component 460, communication interface 470, and/or the like) may receive, from a second network function device, second locality and priority information concerning the second network function device, as described above. The second locality and priority information may indicate one or more localities associated with the second network function device, wherein, for each locality of the one or more localities, the second locality and priority information indicates a priority order value for the second network function device.

As further shown in FIG. 5, process 500 may include updating a data structure based on the first locality and priority information and the second locality and priority information (block 530). For example, the NRF device (e.g., using processor 420, memory 430, storage component 440, input component 450, output component 460, communication interface 470, and/or the like) may update a data structure based on the first locality and priority information and the second locality and priority information, as described above. For example, the NRF device may parse the first locality and priority information to determine one or more localities and one or more respective priority order values associated with the first network function device, and may update the data structure to indicate the one or more localities and the one or more respective priority order values for the first network function device. In some implementations, the NRF device may send a first acknowledgment message to the first network function device and/or a second acknowledgment message to the second network function device after updating the data structure.

As further shown in FIG. 5, process 500 may include receiving, from a third network function device, a query concerning a locality (block 540). For example, the NRF device (e.g., using processor 420, memory 430, storage component 440, input component 450, output component 460, communication interface 470, and/or the like) may receive, from a third network function device, a query concerning a locality, as described above. The query may indicate a locality associated with the third network function device.

As further shown in FIG. 5, process 500 may include searching the data structure based on the query to identify network function device information associated with the locality (block 550). For example, the NRF device (e.g., using processor 420, memory 430, storage component 440, input component 450, output component 460, communication interface 470, and/or the like) may search the data structure based on the query to identify network function device information associated with the locality, as described above. For example, the NRF device may parse the query to identify a locality associated with the third network function device, and may search the data structure based on the locality to identify the network function device information. The network function device information may indicate the locality, a first priority order value of the first network function device for the locality, and/or a second priority order value of the second network function device for the locality.

As further shown in FIG. 5, process 500 may include sending, to the third network function device, the network function device information (block 560). For example, the NRF device (e.g., using processor 420, memory 430, storage component 440, input component 450, output component 460, communication interface 470, and/or the like) may send, to the third network function device, the network function device information, as described above. In some implementations, sending the network function device information to the third network function device may cause and/or permit the third network function device to initiate a communication session with the first network function device or the second network function device.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
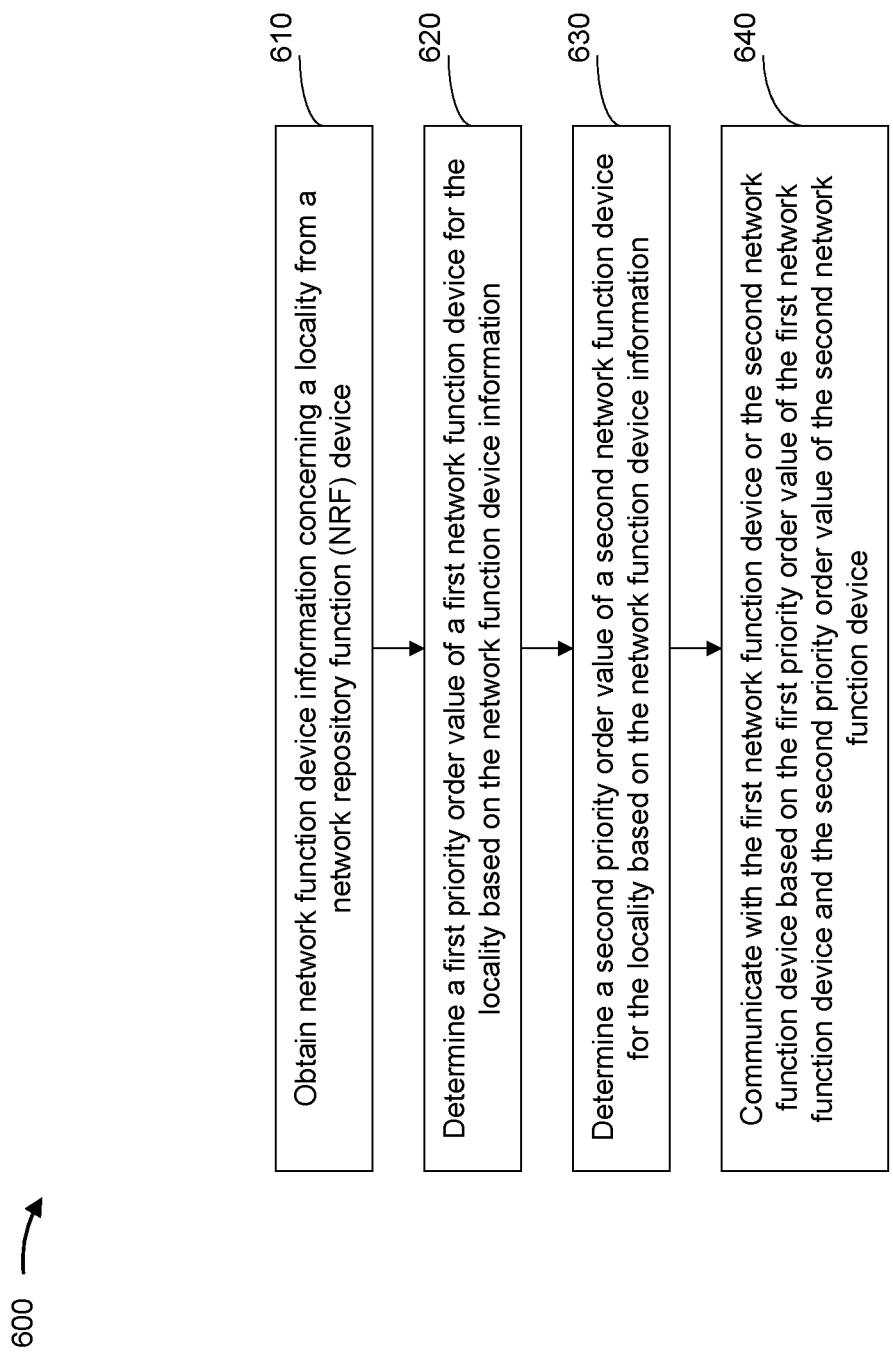

FIG. 6 is a flow chart of an example process 600 for facilitating network function device discovery. In some implementations, one or more process blocks of FIG. 6 may be performed by a network function (NF) device (e.g., third NF device 108, NSSF device 302, NEF device 304, AUSF device 306, UDM device 308, PCF device 310, AF device 312, AMF device 314, SMF device 316, NRF device 318, NSSF device 302-1, NEF device 304-1, AUSF device 306-1, UDM device 308-1, PCF device 310-1, AF device 312-1, AMF device 314-1, SMF device 316-1, NRF device 318-1, and/or the like). In some implementations, one or more process blocks of FIG. 6 may be performed by another device or a group of devices separate from or including the NF device, such as a different network function (NF) device (e.g., first NF device 102, second NF device 104, NSSF device 302, NEF device 304, AUSF device 306, UDM device 308, PCF device 310, AF device 312, AMF device 314, SMF device 316, NRF device 318, NSSF device 302-1, NEF device 304-1, AUSF device 306-1, UDM device 308-1, PCF device 310-1, AF device 312-1, AMF device 314-1, SMF device 316-1, NRF device 318-1, and/or the like).

As shown in FIG. 6, process 600 may include obtaining network function device information concerning a locality from an NRF device (block 610). For example, the NF device (e.g., using processor 420, memory 430, storage component 440, input component 450, output component 460, communication interface 470, and/or the like) may obtain network function device information concerning a locality from an NRF device, as described above. For example, the NF device may send a query concerning the locality to the NRF device and may obtain, after sending the query, the network function device information from the NRF device. As another example, the NF device may send a subscription request concerning the locality to the NRF device and may obtain, after sending the subscription request, the network function device information from the NRF device. The network function device information may identify the first network function device and the first priority order value of the first network function device for the locality, the second network function device and the second priority order value of the second network function device for the locality, and at least one additional network function device not associated with the locality.

As further shown in FIG. 6, process 600 may include determining a first priority order value of a first network function device for the locality based on the network function device information (block 620). For example, the NF device (e.g., using processor 420, memory 430, storage component 440, input component 450, output component 460, communication interface 470, and/or the like) may determine a first priority order value of a first network function device for the locality based on the network function device information, as described above.

As further shown in FIG. 6, process 600 may include determining a second priority order value of a second network function device for the locality based on the network function device information (block 630). For example, the NF device (e.g., using processor 420, memory 430, storage component 440, input component 450, output component 460, communication interface 470, and/or the like) may determine a second priority order value of a second network function device for the locality based on the network function device information, as described above.

As further shown in FIG. 6, process 600 may include communicating with the first network function device or the second network function device based on the first priority order value of the first network function device and the second priority order value of the second network function device (block 640). For example, the NF device (e.g., using processor 420, memory 430, storage component 440, input component 450, output component 460, communication interface 470, and/or the like) may communicate with the first network function device or the second network function device based on the first priority order value of the first network function device and the second priority order value of the second network function device, as described above. For example, the NF device may determine, based on the first priority order value of the first network function device and the second priority order value of the second network function device, that the first network function device has a greater priority than the second network function device for the locality, and may, based on determining that the first network function device has a greater priority than the second network function device for the locality, initiate a communication session with the first network function device. Additionally, or alternatively, the NF device may determine that the first communication session cannot be established and may, based on determining that the first communication session cannot be established, initiate a second communication session with the second network function device. In some implementations, the first network function device and the second network function device are a same type of network function device.

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a network repository function (NRF) device and from a network function device, locality and priority information concerning the network function device,
    wherein the locality and priority information indicates a particular priority order in which to discover, via network function device discovery, and communicate with the network function device for a location, indicated by the locality and priority information, as compared to other network function devices;
parsing, by the NRF device, the locality and priority information to determine one or more localities and one or more respective priority order values associated with the network function device;
updating, by the NRF device, a data structure to indicate the one or more localities and the one or more respective priority order values for the network function device;
receiving, by the NRF device, from a third network function device, a query concerning a locality;
searching, by the NRF device, the data structure based on the query to identify network function device information associated with the locality; and
sending, by the NRF device, to the third network function device, the network function device information,
    wherein the network function device information includes information indicating at least one network function device not associated with the locality,
        wherein the information allows the third network function device to attempt to initiate a communication session with the at least one network function device based on failure to establish a communication session with other network function devices in the particular priority order.

2. The method of claim 1, further comprising:
receiving, from an other network function device, a subscription request concerning a particular locality; and
sending, to the other network function device and based on the data structure, information identifying a preferred network function device associated with the particular locality.

3. The method of claim 1, wherein the locality and priority information includes:
information identifying an other locality associated with the network function device, and
information identifying a priority of the network function device for the other locality.

4. The method of claim 1, further comprising:
sending, based on updating the data structure, an acknowledgement message to the network function device.

5. The method of claim 1, wherein the one or more respective priority order values associated with the network function device are associated with a priority order in which to attempt to initiate a communication session with the network function device.

6. The method of claim 1, further comprising:
receiving, from an other network function device, an other query concerning a particular locality associated with the network function device; and
sending, to the other network function device and based on the data structure, information causing the other network function device to initiate a communication session with the network function device.

7. The method of claim 1, further comprising:
receiving, from a different network function device, different locality and priority information concerning the different network function device; and
wherein, the one or more respective priority order values for the network function device includes information indicating a priority of the network function device compared to the different network function device for a particular locality.

8. A non-transitory computer-readable medium storing a set of instructions, the set of instructions comprising:
one or more instructions that, when executed by one or more processors of a network repository function (NRF) device, cause the NRF device to:
    receive, from a network function device, locality and priority information concerning the network function device,
        wherein the locality and priority information indicates a particular priority order in which to discover, via network function device discovery, and communicate with the network function device for a location, indicated by the locality and priority information, as compared to other network function devices;
    parse the locality and priority information to determine one or more localities and one or more respective priority order values associated with the network function device;
    update a data structure to indicate the one or more localities and the one or more respective priority order values for the network function device;
    receive, from a third network function device, a query concerning a locality;
    search the data structure based on the query to identify network function device information associated with the locality; and
    send to the third network function device, the network function device information,
        wherein the network function device information includes information indicating at least one network function device not associated with the locality,
        wherein the information allows the third network function device to attempt to initiate a communication session with the at least one network function device based on failure to establish a communication session with other network function devices in the particular priority order.

9. The non-transitory computer-readable medium of claim 8, wherein the one or more instructions further cause the NRF device to:
receive, from an other network function device, a subscription request concerning a particular locality; and
send, to the other network function device and based on the data structure, information identifying a preferred network function device associated with the particular locality.

10. The non-transitory computer-readable medium of claim 8, wherein the locality and priority information includes:
information identifying an other locality associated with the network function device, and
information identifying a priority of the network function device for the other locality as compared to other network function devices.

11. The non-transitory computer-readable medium of claim 8, wherein the one or more instructions further cause the NRF device to:
send, based on updating the data structure, an acknowledgement message to the network function device.

12. The non-transitory computer-readable medium of claim 8, wherein the one or more respective priority order values associated with the network function device are associated with a priority order in which to attempt to initiate a communication session with the network function device.

13. The non-transitory computer-readable medium of claim 8, wherein the one or more instructions further cause the NRF device to:
receive, from an other network function device, an other query concerning a particular locality associated with the network function device; and
send, to the other network function device and based on the data structure, information causing the other network function device to initiate a communication session with the network function device.

14. The non-transitory computer-readable medium of claim 8, wherein the one or more instructions further cause the NRF device to:
receive, from a different network function device, different locality and priority information concerning the different network function device; and
wherein, the one or more respective priority order values for the network function device includes information indicating a priority of the network function device compared to the different network function device for a particular locality.

15. A network repository function (NRF) device, comprising:
one or more processors configured to:
receive from a network function device, locality and priority information concerning the network function device,
wherein the locality and priority information indicates a particular priority order in which to discover, via network function device discovery;
communicate with the network function device for a location, indicated by the locality and priority information, as compared to other network function devices;
parse the locality and priority information to determine one or more localities and one or more respective priority order values associated with the network function device;
update a data structure to indicate the one or more localities and the one or more respective priority order values for the network function device;
receive, from a third network function device, a query concerning a locality;
search the data structure based on the query to identify network function device information associated with the locality; and
send to the third network function device, the network function device information,
wherein the network function device information includes information indicating at least one network function device not associated with the locality,
wherein the information allows the third network function device to attempt to initiate a communication session with the at least one network function device based on failure to establish a communication session with other network function devices in the particular priority order.

16. The NRF device of claim 15, wherein the one or more processors are further configured to:
receive, from an other network function device, a subscription request concerning a particular locality; and
send, to the other network function device and based on the data structure, information identifying a preferred network function device associated with the particular locality.

17. The NRF device of claim 15, wherein the one or more processors are further configured to:
send, based on updating the data structure, an acknowledgement message to the network function device.

18. The NRF device of claim 15, wherein the one or more respective priority order values associated with the network function device are associated with a priority order in which to attempt to initiate a communication session with the network function device.

19. The NRF device of claim 15, wherein the one or more processors are further configured to:
receive, from an other network function device, an other query concerning a particular locality associated with the network function device; and
send, to the other network function device and based on the data structure, information causing the other network function device to initiate a communication session with the network function device.

20. The NRF device of claim 15, wherein the one or more processors are further configured to:
receive, from a different network function device, different locality and priority information concerning the different network function device; and
wherein, the one or more respective priority order values for the network function device includes information indicating a priority of the network function device compared to the different network function device for a particular locality.

* * * * *